United States Patent [19]

Miller

[11] 4,225,115
[45] Sep. 30, 1980

[54] GATE VALVE
[75] Inventor: Don R. Miller, Ashland, Ohio
[73] Assignee: U-Brand Corporation, Ashland, Ohio
[21] Appl. No.: 945,791
[22] Filed: Sep. 25, 1978
[51] Int. Cl.³ .................................................. F16K 3/12
[52] U.S. Cl. ..................................... 251/327; 251/329
[58] Field of Search ................ 251/327, 326, 328, 329
[56] References Cited
U.S. PATENT DOCUMENTS

| 3,829,061 | 8/1974 | Dayne et al. | 251/328 |
| 4,112,969 | 9/1978 | Still | 251/328 |

FOREIGN PATENT DOCUMENTS

| 176234 | 8/1961 | Sweden | 251/327 |

Primary Examiner—Arnold Rosenthal
Attorney, Agent, or Firm—Isler and Ornstein

[57] ABSTRACT

A gate valve is disclosed in which a plastic molded gate is utilized, having sealing beads molded integrally with the gate to produce a fluid-tight seal between the gate and the body of the gate valve. A unique molding method is employed, wherein the core part of the mold which establishes the valve chamber in the valve body can be released or withdrawn from the plastic parts without tearing or otherwise mutilating the sealing beads, and wherein a separate two-piece mold is employed for molding the gate, and in which the gate molding parts are utilized to provide sealing beads on the gate.

2 Claims, 10 Drawing Figures

GATE VALVE

This invention relates, as indicated, to a gate valve, but has reference more particularly to a gate valve in which sealing beads are employed.

In U.S. Pat. No. 3,829,061, a gate valve is disclosed, in which the lower portion of the molded plastic body defines a pair of axially spaced substantially oppositely disposed and opposing flat, downwardly convergent valve seat surfaces, which extend transversely of the axis of the horizontal flow passage and are inclined from 5° to 7½° from vertical.

The gate of the aforesaid valve is also a unitary molded plastic block-like part with a central, vertical threaded stem-receiving opening and has a pair of substantially flat axially spaced, substantially oppositely disposed downwardly convergent sealing surfaces, which occur on planes extending transversely of the axis of the flow passage and parallel with the planes of the seat or seal surfaces in the body.

In order to establish fluid tight seals between the sealing surfaces of the valving gate and the valve seat surfaces of the valve body, the patentees provide annular sealing beads which are formed or molded integrally on the valve seat surfaces, simultaneously with the molding of the body; these beads projecting, for example, 0.005" from the valve seat surfaces.

It is indicated, in the aforesaid patent, that sealing beads of sufficient size and extent, to be effective could not be effectively molded in the valve bodies, since the core part of the mold which establishes the valve chamber, with its relatively inclined valve seat surfaces and in which the bead forming grooves must be established, could not release the beads and could not be withdrawn from the plastic parts without tearing or otherwise mutilating the beads and rendering them inoperative.

In an effort to overcome such disadvantages, the patentees utilized beads of allegedly unique cross-sectional configuration, designed to resist shearing and/or rolling when engaged by the gate, but which beads were obviously difficult to form in the molding operation.

The beads are stated to be of such design that at no place was there presented a downwardly disposed shoulder or ledge about the perimeter of the beads to interfere with or prevent pulling, or extraction of a male mold element, or part employed to establish the beads, their related seat faces and the chamber of the molded valve body.

The present invention has, as its primary object, the utilization, in a gate valve of the character described, of sealing beads which are molded integrally with the valve gate, rather than with the valve body, a change which (a) enables beads of conventional uniform cross-section to be utilized to produce a fluid-tight seal between the gate and the body of the gate valve, (b) enables the core part of the mold which establishes the valve chamber to be released or withdrawn from the plastic parts without tearing or otherwise mutilating the beads and rendering them inoperative, and (c) permits closure of the valve gate to be effected without causing shearing and/or rolling or other distortion when engaged by valve seat surfaces.

Another object of the invention is to provide a novel method of molding a plastic gate for a gate valve of the character described in the course of which the gate is provided with sealing beads molded integrally with the gate.

Other objects and advantages of the invention will appear or become apparent in the course of the following description, taken in conjunction with the drawings and wherein like reference characters and numerals are used throughout to designate like parts.

Figure 3:
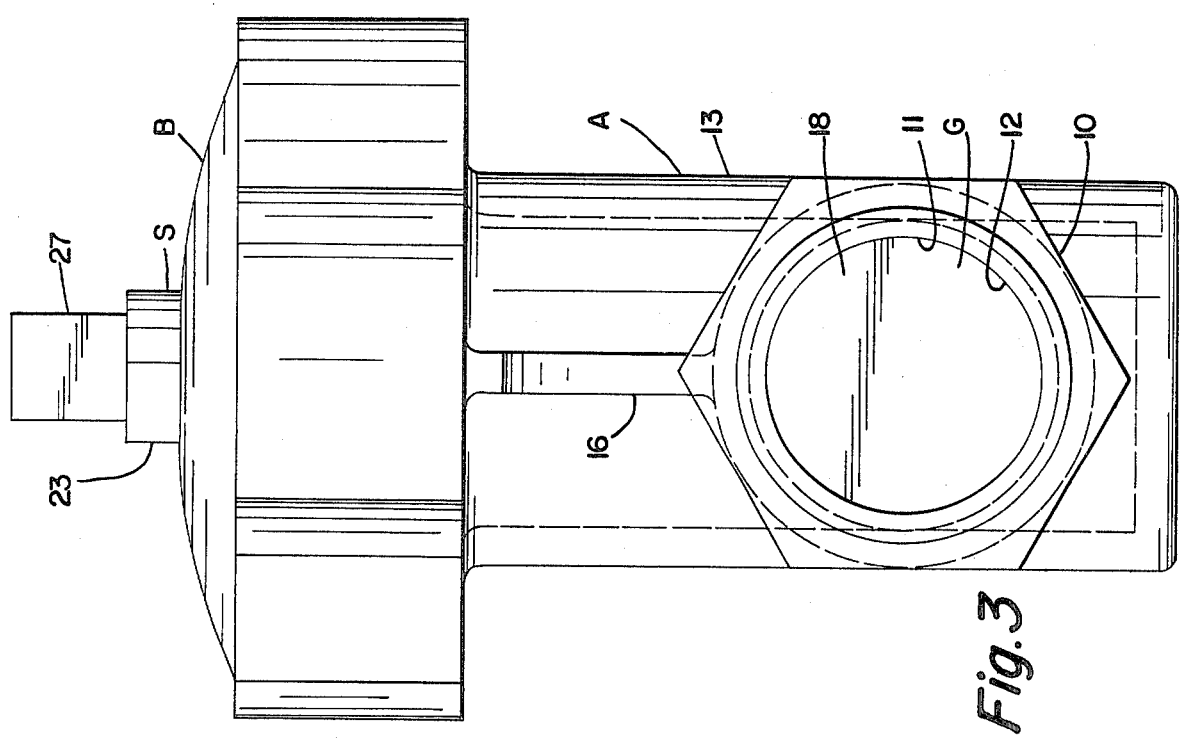
FIG. 3 is an end elevational view of the gate valve of FIG. 1, as viewed from the right side of FIG. 1, but with the wheel handle omitted.
Figure 1:
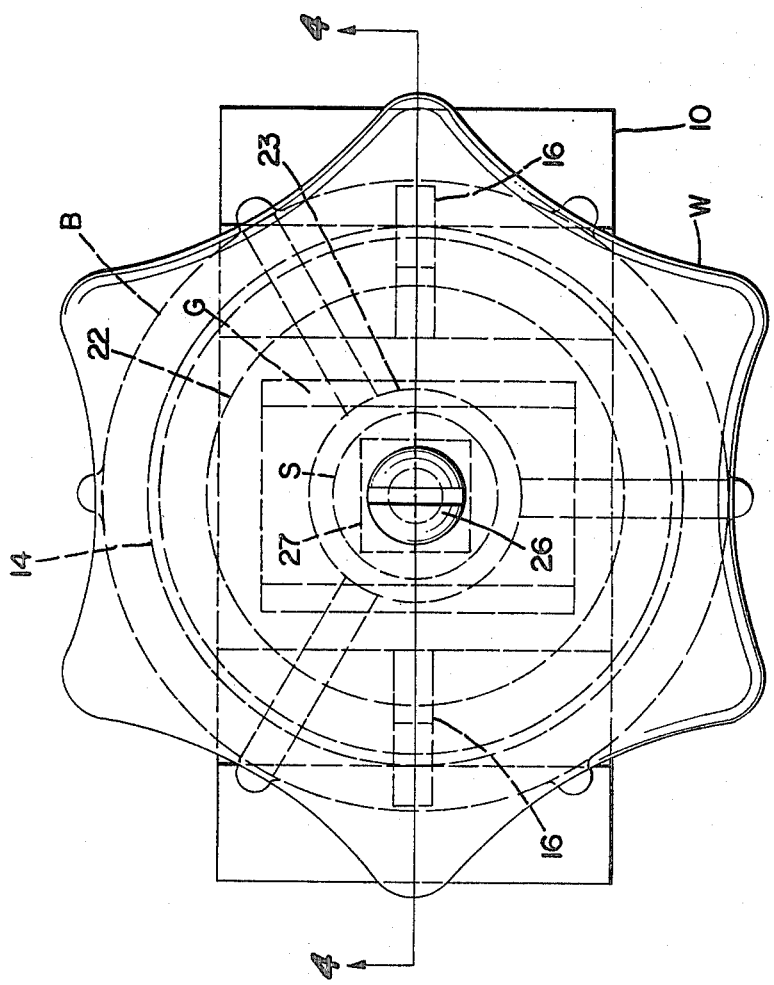
FIG. 1 is a top plan view of a plastic gate valve embodying the invention.
Figure 2:
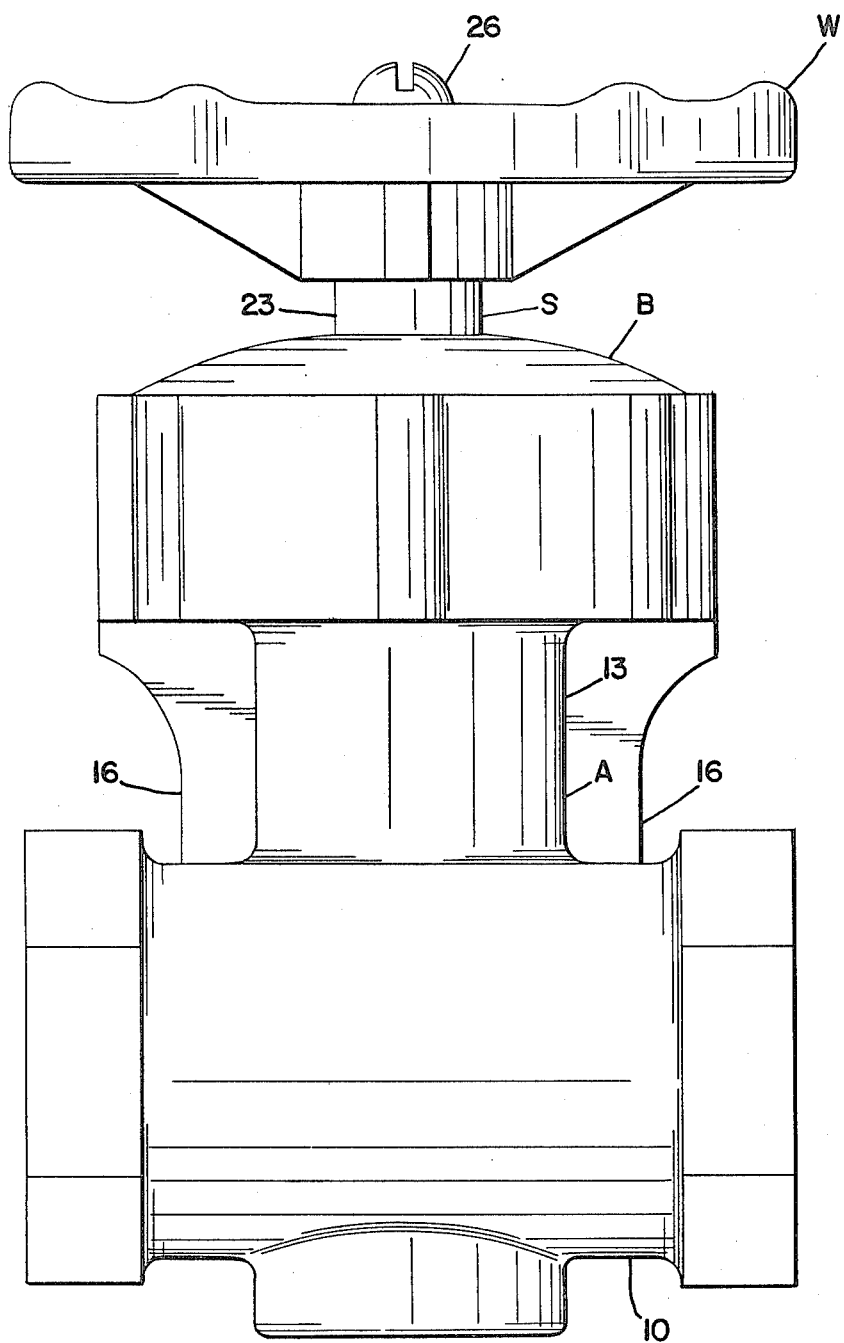
FIG. 2 is a side elevational view of the gate valve of FIG. 1.
Figure 4:
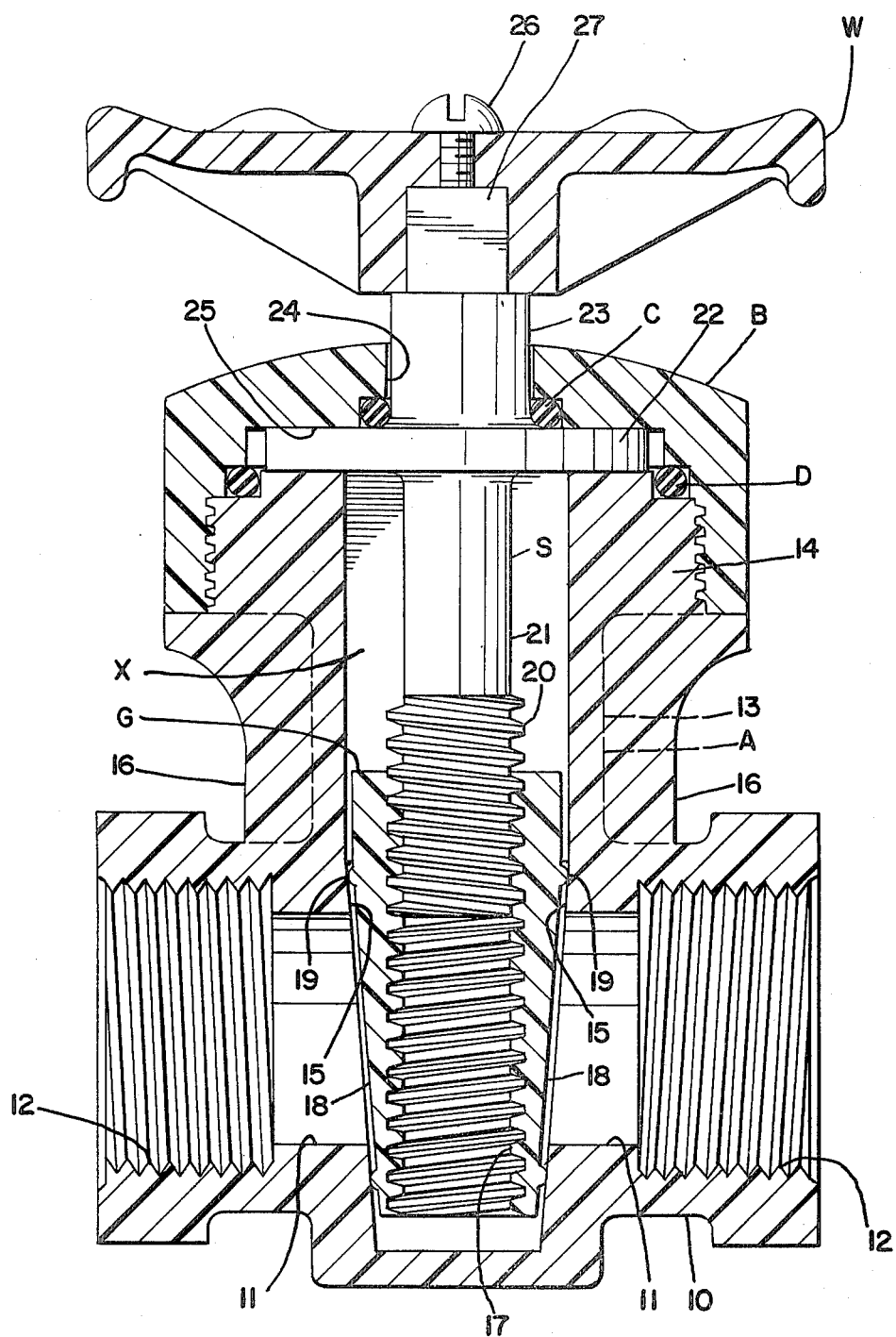
FIG. 4 is a vertical cross-sectional view, taken on the line 4—4 of FIG. 1.
Figure 5:
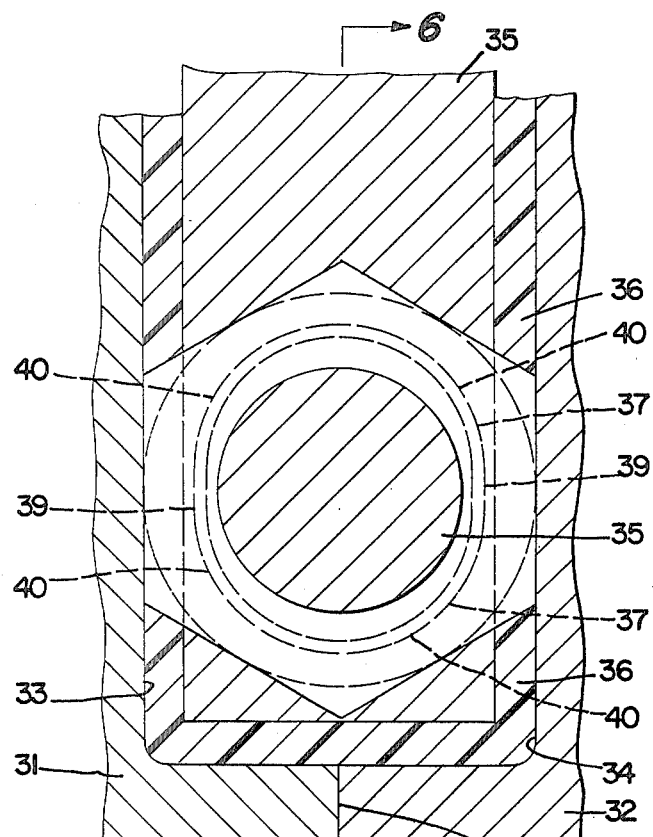
Figure 6:
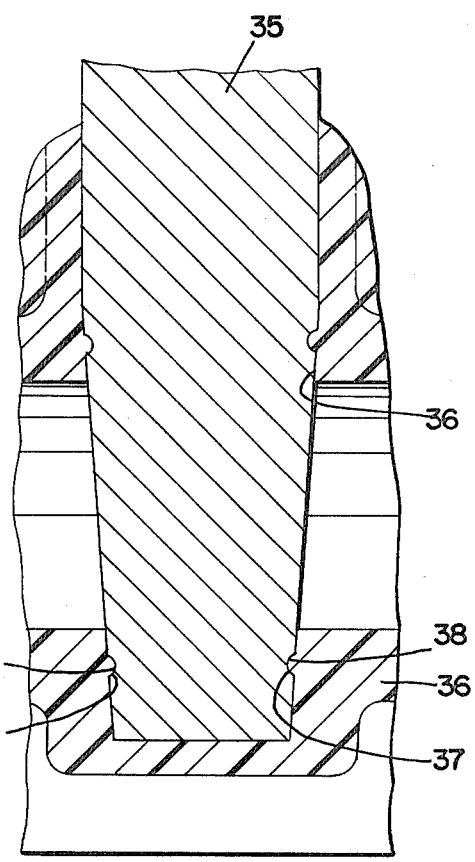
Figure 7:
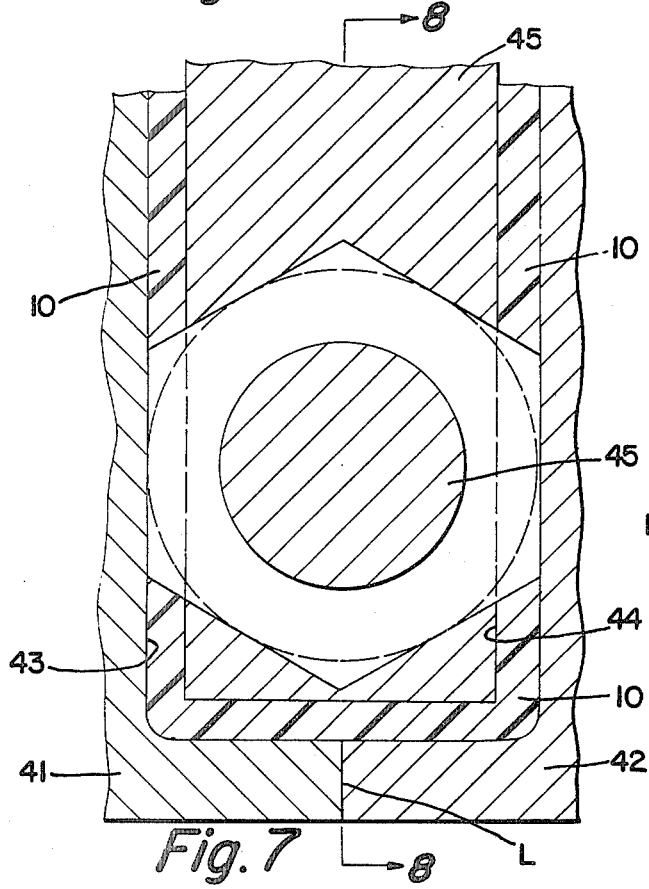
Figure 8:
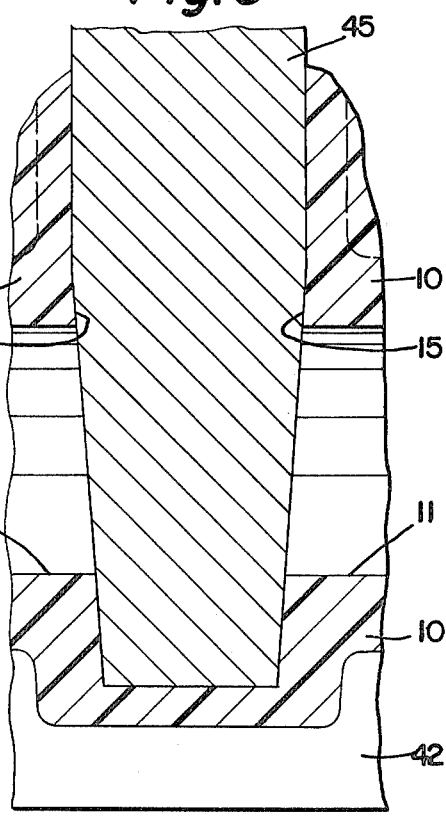
Figure 9:
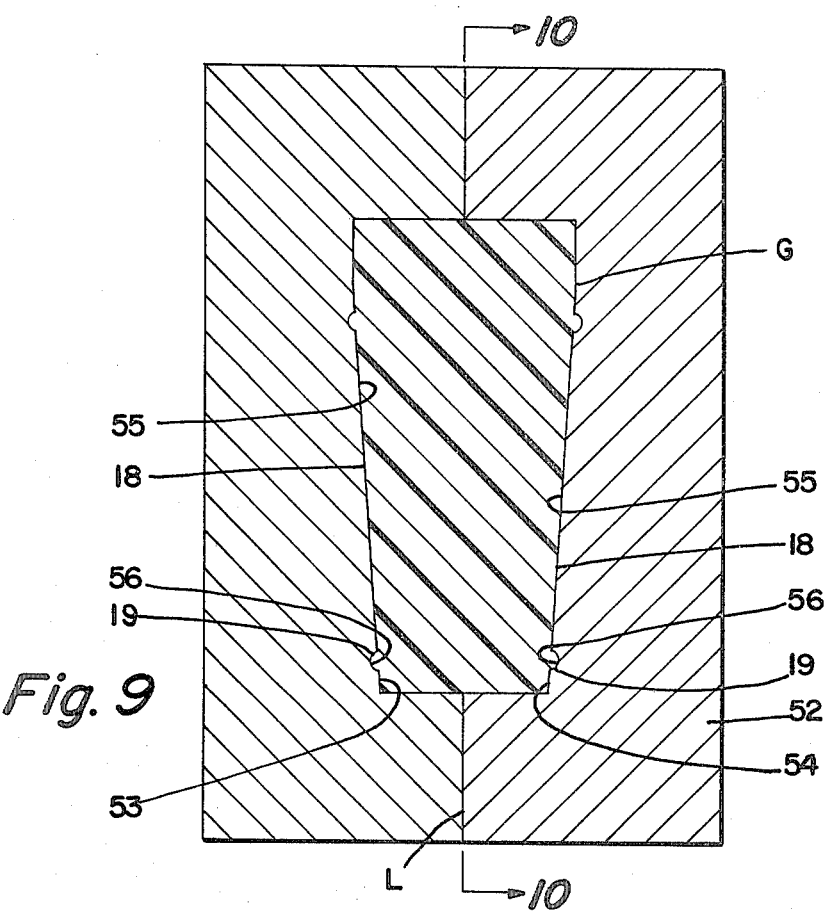
Figure 10:
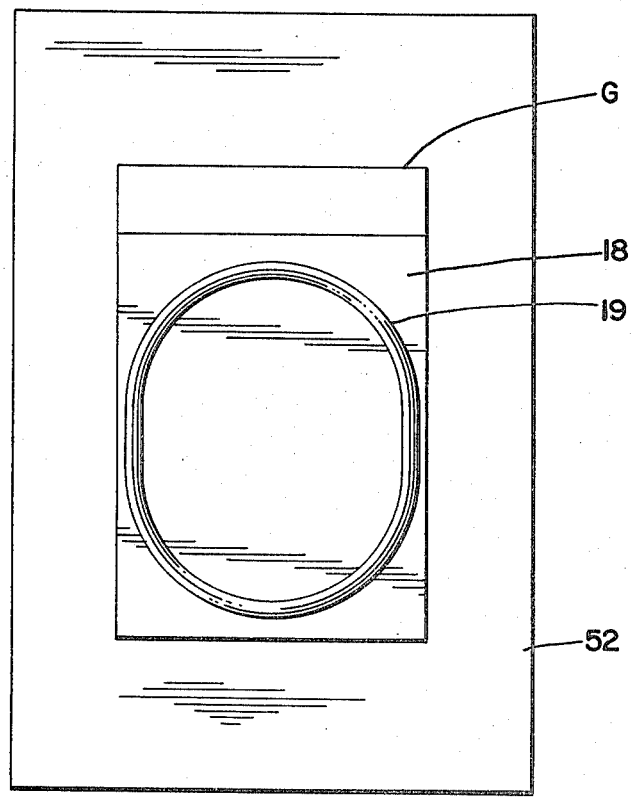

FIG. 5 is a fragmentary cross-sectional view, illustrating in somewhat diagrammatic manner, the method of molding a valve body having sealing ribs on the valve seating surfaces thereof, as in the aforesaid U.S. Pat. No. 3,829,061, but with sealing beads of semi-circular cross-section;

FIG. 6 is a fragmentary cross-sectional view, taken on the line 6—6 of FIG. 5;

FIG. 7 is a view similar to FIG. 5, but showing the method of making the valve body of the present invention, utilizing a core mold devoid of sealing ribs;

FIG. 8 is a fragmentary cross-sectional view, taken on the line 8—8 of FIG. 7;

FIG. 9 is a cross-sectional view, illustrating in somewhat diagrammatic manner, the method of molding the valve gate of the present invention, and FIG. 10 is cross-sectional view, taken on the line 10—10 of FIG. 9.

Referring more particularly to FIGS. 1 to 4 inclusive of the drawings, a gate valve, in accordance with the invention, is composed of molded plastic parts, including a valve body A, a gate G, a stem S, a bonnet B, and a hand wheel W. Each of these parts is a unitary part molded of a suitable, strong, rigid, yet resilient material, such, for example, as Celcon.

The valve structure further includes a first O-ring seal C between the stem S and the bonnet B and a second O-ring seal D between the bonnet B and the body A.

The body A comprises an elongated, horizontal lower portion 10 having a central flow passage 11 extending longitudinally therethrough and having pipe connecting means 12 at its opposite ends to connect the body with related fluid conducting pipes (not shown). The means 12 may be conventional pipe thread means, as shown, or any other form of connecting means.

The body A also includes an elongated, vertical, upper chest portion 13 midway between the ends of the lower portion and which projects upwardly from the lower portion 10 of the body, and terminates at its upper end, in a flange 14.

The chest 13 and flange 14 define an elongate, vertically extending valve chamber X having a substantially straight, vertical upper portion opening at the upper end of the body A and a lower portion intersecting the flow passage 11 in the lower portion 10 of the body and defining a pair of axially spaced, substantially oppositely disposed and opposing, flat, downwardly convergent valve seat surfaces 15. These surfaces 15 extend transversely of the axis of the horizontal flow passage 11 and are inclined at an angle of about 4° from the vertical.

It is to be noted that the surfaces 15 are free of any sealing beads, such for example, as the sealing beads disclosed in U.S. Pat. No. 3,829,061, to which reference has been made hereinbefore.

The body A further includes a pair of ribs 16, which are molded integrally with the body and extend radially-outwardly from diametrically-opposite sides of the chest portion 13 of the body, to points beyond the periphery of the flange 14. The function of these ribs 16 will be presently explained.

The valve gate G is a simple, unitary molded plastic blocklike part having a central vertical, threaded stem receiving opening 17 and a pair of substantially flat axially spaced substantially oppositely disposed downwardly convergent surfaces 18. These surfaces 18 lie in planes extending transversely of the axis of the flow passage 11 and parallel with the planes of the surfaces 15 in the valve body.

An important feature of the invention resides in the provision of novel sealing means in the form of sealing beads 19 of elliptical configuration and semi-circular cross-section, which are molded integrally with the gate G and extend outwardly from the surfaces 18 of the gate. These beads 19 are designed to establish fluid-tight seals between the gate G and the valve seat surfaces 15 of the valve body which oppose the surfaces 18.

The stem S is an elongate, vertical unitary molded plastic part arranged centrally of the chamber X and having a lower threaded portion 20 terminating in the chamber adjacent the uppermost plane of the flow passage 11 and threaded in the opening 17 in the gate G, a central portion 21 extending through the chamber X and having a thrust flange 22 thereon engaging the upper end of the flange 14, and an upper portion 23 projecting upwardly through the bonnet B.

The bonnet B is a unitary molded plastic part screw-threaded onto the flange 14 to close the top of the chamber X and has a central opening 24 through which the portion 23 of the stem projects and defines a downwardly disposed surface 25 engageable with the thrust flange 22.

The hand wheel W is a unitary molded plastic part secured, as by a screw 26 to the square upper terminal end 27 of the stem S.

The seal C is a simple O-ring disposed about the upper portion 23 of the stem S between the bonnet B and the thrust flange 22 of the stem.

The seal D is a simple O-ring seal disposed about the upper end of the flange 14 of the body A, between the flange 14 and the bonnet B.

In FIGS. 5 and 6, the method of molding the gate valve body of U.S. Pat. No. 3,829,061 is illustrated in a somewhat diagrammatic manner.

In this method, the gate valve body is molded in a two-piece steel mold by the plastic injection process.

The two pieces of the steel mold are designated by reference numerals 31 and 32, and are brought together at the parting line L, the piece 31 having a cavity 33 shaped to form the exterior of one half of the body of the valve, and the other piece 32 having a cavity 34 shaped to form the exterior of the other half of the body of the valve. The two pieces, in other words, are provided with matched cavities required to form the exterior shape of the valve body.

A steel core 35 shaped to provide the desired gate cavity 36 in the body of the valve is placed inside the mold pieces 31 and 32, in the position shown in FIGS. 5 and 6, and is supported by means (not shown) disposed externally of the mold pieces 31 and 32.

During the injection molding process, the two pieces 31 and 32 of the body mold are brought together at the parting line L, and the gate cavity core 35 is inserted into the body mold cavities 33 and 34, after which plastic material is heated to a liquified state and injected into the body cavities 33 and 34, filling these cavities and surrounding the suspended core 35. The liquified plastic is injected at high temperatures and pressures.

After the cavities 33 and 34 have been completely filled, the flow of plastic material, designated by reference numeral 36, is stopped and the liquified material 36 in the mold is permitted to cool and revert to a solid state.

After a predetermined interval of time to permit the liquified material 36 to solidify, the steel core 35 is removed from the mold pieces 31 and 32, while the plastic valve body, consisting of the material 36 remains in the pieces 31 and 32.

During this cooling of the plastic material, the plastic material 36 will shrink and become tightly bound to the steel core 35. The extent of this shrinkage may vary from 0.002" to 0.030", depending on the type of plastic material used.

Because of this shrinkage about the core 35, considerable tension is required to remove the core 35 from the plasic body 36.

In order to provide the sealing beads 37 on the valve body, the steel core 35 is provided with grooves 38 of a cross-section such that when filled with the plastic material 36, and the core removed, the plastic material should leave the sealing beads 37 on the valve body.

During such removal of the core, the portions of the beads 37 which are parallel to the direction in which the core is moved when pulled from the mold, and which portions are indicated by the reference 39, permit the core to be pulled without disturbing or distorting these portions of the sealing beads 37.

However, the remaining portions of the beads 37, which are not parallel to the direction in which the core is moved when pulled from the mold, and which portions are generally designated by reference numerals 40 require the core to be pulled over these portions of the beads 37, a practice which is known as "core jumping".

This "core jumping" causes rubbing of the beads by edges of the core grooves 38, resulting in a distortion or misshaping of the beads so that the beads are not uniform throughout their length, and cannot perform their intended function of sealing off the fluid flow, and permitting leakage about the distorted beads.

In molding the gate valve body and gate shown in FIGS. 1 to 4 inclusive of the drawings, the method illustrated in a somewhat diagrammatic manner in FIGS. 7, 8, 9 and 10 is employed.

In this method, the gate valve body is molded in a two-piece steel mold by the plastic injection process.

The two pieces of the steel mold are designated by reference numerals 41 and 42, and are brought together at the parting line L, the piece 41 having a cavity 43 shaped to form the exterior of one half of the body of the valve, and the other piece 42 having a cavity 44 shaped to form the exterior of the other half of the body of the valve. The two pieces, in other words, are provided with matched cavities required to form the exterior shape of the valve body.

A steel core 45 shaped to provide the desired gate cavity 46 in the body of the valve is placed inside the mold pieces 41 and 42, in the position shown in FIGS. 7 and 8, and is supported by means (not shown) disposed externally of the mold pieces 41 and 42.

The steel core 45, in this instance, is devoid of the grooves 38 of the core 35 shown in FIGS. 5 and 6 but, instead has smooth sides throughout its length.

During the injection molding process, the two pieces 41 and 42 of the body mold are brought together at the parting line L and the gate cavity core 45 is inserted into the body mold cavities 43 and 44, after which plastic material is heated to a liquified state and injected into the body cavities 43 and 44, filling these cavities and surrounding the suspended core 45. The liquified plastic is injected at high temperatures and pressures.

After the cavities 43 and 44 have been completely filled, the flow of plastic material, designated by reference numeral 10, is stopped, and the liquified material 10 in the mold is permitted to cool and revert to a solid state.

After a predetermined interval of time to permit the liquified material 10 to solidify, the steel core 45 is removed from the mold pieces 41 and 42, while the plastic valve body consisting of the material 10 remains in the pieces 41 and 42.

During this cooling of the plastic material, the plastic material 10 will shrink and become tightly bound to the steel core 45. The extent of this shrinkage may vary from 0.002" to 0.030", depending on the type of plastic material.

Because of this shrinkage, about the core 45, considerable tension is required to remove the core 45 from the plastic body 10.

Due however to the fact that the core 45 is devoid of the grooves 38 of the core shown in FIGS. 5 and 6, but instead has smooth sides throughout their length, no difficulty is encountered in pulling the core 45 and the surfaces 15 which are to be engaged by the gate are left smooth and unaltered. The surfaces 15, it may be noted, are inclined at an angle of about 4° from the vertical.

In this method, a separate mold is required to mold the valve gate, since the gate, instead of the valve body, is provided with sealing beads.

The gate G, as shown in FIGS. 9 and 10, is molded in a twopiece steel mold by the plastic injection process.

The two pieces of this steel mold are designated by reference numerals 51 and 52, and are brought together at the parting line L, the piece 51 having a cavity 53 shaped to form one half of the gate, and the other piece 52 having a cavity 54 shaped to form the other half of the gate. The two pieces, in other words, are provides with matched cavities required to form the entire gate.

In order to provide the gate G with sealing beads, the mold pieces 51 and 52 have convergent faces 55, which are inclined at an angle of about 4° from the vertical to correspond to the angle of inclination of the surfaces 15 of the valve body.

The faces 55 have grooves 56 therein of elliptical configuration and semi-circular cross-section, such that when the pieces 51 and 52 are separated from each other, the plastic material will provide sealing beads 19 of elliptical configuration and semi-circular cross-section molded integrally with the gate and extending outwardly from the inclined surfaces 18 of the gate.

In the injection molding process, the two pieces 51 and 52 are brought together at the parting line L and plastic material under pressure is injected into the gate cavity 53–54 until the cavity is filled and the sealing beads 19 formed.

After the plastic material has cooled, the mold pieces 51 and 52 are separated or opened, permitting the gate to be freely ejected without damage or distortion of the sealing beads 19.

This method, accordingly, provides uniform molded sealing beads on the gate, so that when the gate is placed in gate cavity of the valve body, which has smooth tapered walls, the sealing ribs will come into contact with the gate cavity walls of the body uniformly and as fluid pressure is applied, a complete fluid shutoff is effected.

The upper ends of the ribs 16 serve as position stops to limit the extent to which the bonnet B can be screwed onto the flange 14, thereby preventing breakage of the bonnet caused by excessive pressure when securing the bonnet to the flange 14.

It is to be understood that the form of my invention, herein shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a gate valve of the character described, a plastic valve body having a flow passage extending horizontally through said valve body, said body having downwardly convergent valve seat surfaces extending transversely of the axis of said horizontal flow passage and inclined at an angle to said axis, said surfaces being flat and being devoid of sealing beads projecting from said surfaces, and a plastic gate having substantially oppositely disposed downwardly convergent surfaces lying in planes extending transversely of the axis of said flow passage and parallel with the planes of said valve seat surfaces, said gate surfaces having sealing beads of elliptical configuration molded integrally with said gate and projecting outwardly from said gate surfaces and adapted for sealing engagement with said valve seat surfaces.

2. A gate valve as defined in claim 1, wherein said sealing beads are of elliptical configuration and semi-circular in cross-section.

* * * * *